United States Patent
Plum

(10) Patent No.: US 6,427,978 B2
(45) Date of Patent: Aug. 6, 2002

(54) DISRATTLING A HAND LEVER FOR RELEASING THE LATCH MECHANISM OF A BACK REST

(75) Inventor: Wolfgang Plum, Mönchengladbach (DE)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/732,619

(22) Filed: Dec. 8, 2000

(30) Foreign Application Priority Data

Dec. 9, 1999 (DE) ..................... 299 21 648 U

(51) Int. Cl.⁷ .................................................. B66F 3/00
(52) U.S. Cl. ............................ 254/131; 29/267; 29/270
(58) Field of Search ............................ 254/131; 29/267, 29/270

(56) References Cited

U.S. PATENT DOCUMENTS

| | | | | |
|---|---|---|---|---|
| 3,756,655 A | * | 9/1973 | Perkins | ........................ 297/379 |
| 4,038,508 A | | 7/1977 | Mapelsden | |
| 4,616,876 A | | 10/1986 | Suzuki et al. | |
| 4,932,706 A | * | 6/1990 | Wainwright et al. | .......... 296/69 |
| 5,035,038 A | * | 7/1991 | Streett | ........................ 29/270 |
| 5,201,105 A | * | 4/1993 | Street | ........................ 29/270 |
| 5,537,892 A | | 7/1996 | Wiechman | |
| 6,024,411 A | * | 2/2000 | Pesta et al. | ................. 297/325 |
| 6,148,482 A | * | 11/2000 | Maraman, Jr. | ............... 16/421 |
| 6,226,847 B1 | * | 5/2001 | Breton | ........................ 29/267 |

FOREIGN PATENT DOCUMENTS

EP 0827058 7/1997

OTHER PUBLICATIONS

European Search Report for European Patent Application 00123406. 1–1–2312, related to German Utiltity Model Application 299 21 648.9.

* cited by examiner

Primary Examiner—Joseph J. Hail, III
Assistant Examiner—Lee Wilson
(74) Attorney, Agent, or Firm—Foley & Lardner

(57) ABSTRACT

An apparatus for manually locking and/or unlocking the parts of a vehicle seat includes a housing part and a lever part reaching through an opening in the housing part. The housing part has at least one spring mechanism that latches the lever part in at least one position inside of the opening.

8 Claims, 3 Drawing Sheets

FIG. 5
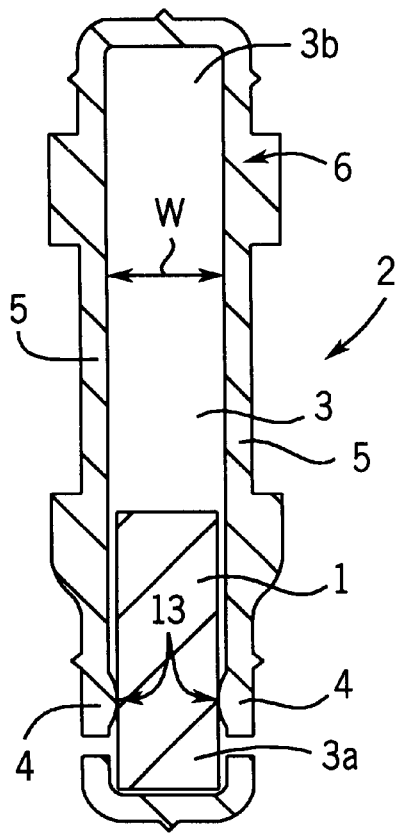
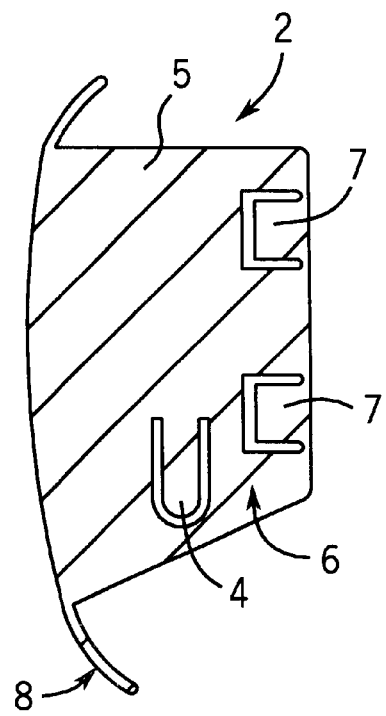
FIG. 6

DISRATTLING A HAND LEVER FOR RELEASING THE LATCH MECHANISM OF A BACK REST

FIELD OF THE INVENTION

The present invention relates to an apparatus for the manual operation, for example for locking and/or unlocking parts of a vehicle seat, consisting of a lever part and of a housing part, and with the lever part reaching through an opening in the housing part.

BACKGROUND OF THE INVENTION

Apparatuses of this kind are known in the art and are in use, for instance, in automotive vehicles for unlocking tilting back supports. In particular, the lever part is guided inside the slot-shaped opening in the housing part. It can be swung from its resting position into an unlocking position in which a catch device of the back support is unlocked by way of an activation section of the lever part. It is a disadvantage of these known apparatuses that rattling noises may occur especially while the car is traveling, e.g. due to vibrations.

Therefore, the subject-matter of the invention is to improve an apparatus of the type described at the outset with minimal constructive complexity and in such a way that the occurrence of any rattling noises is completely eliminated.

SUMMARY OF THE INVENTION

According to the invention this objective is achieved by envisioning at least one spring medium inside the housing part which latches the lever part in at least one of its positions inside the opening.

With the latching action, using the spring medium, a play-free fit of the lever part inside the opening of the housing part is accomplished in a structurally simple manner.

Preferably, the spring medium can be an elastic tongue on a wall of the housing part. A tongue of this kind can consist of e.g. a spring steel sheet metal mechanism that is fastened to the housing part. A particularly preferred embodied example envisions, however, that the elastic tongue is cut free from the wall of the housing part because this makes it possible to manufacture the housing part in one piece, for example as an injection molded part.

Further advantageous characterizing features of the invention are captured in the sub-claims and in the subsequent description.

BRIEF DESCRIPTION OF THE DRAWINGS

Using a preferred embodiment that is illustrated in the drawing the invention is now explained in more detail. Shown are in:

FIG. 5: a cross-sectional view of the housing part of the apparatus according to the invention of the sectional plane V—V in FIG. 1;

FIG. 6: longitudinal of the housing part of the apparatus according to the invention of the sectional plane VI—VI in FIG. 3;

Identical parts in the different figures of the drawing are referenced using the corresponding identical reference symbols. This is why in general each symbol is described only once.

DETAILED DESCRIPTION OF THE PREFERRED EMBODIMENTS

Figure 1:
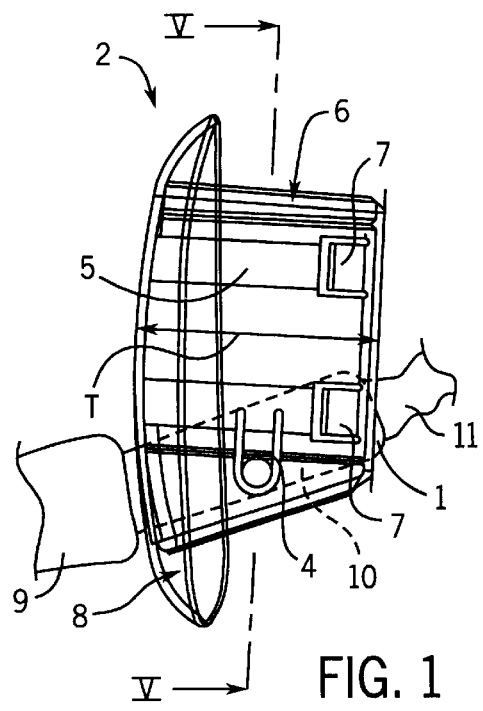
FIG. 1: a housing part of an apparatus according to the invention for the manual unlocking action of a free-swinging device of a back support for an automotive vehicle seat, represented as a wire model in a side view.
Figure 3:
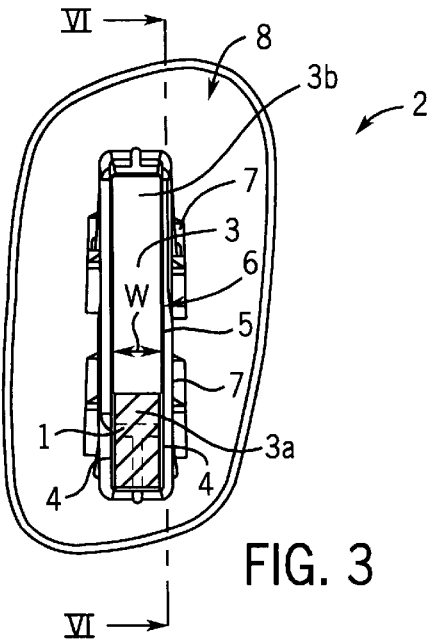
FIG. 3 the housing part in accordance with FIG. 1, represented as wire a model in a front view.

As shown in the figures of the drawing, the apparatus according to the invention is for a manual latch mechanism, such as for locking and/or unlocking of parts of an automotive vehicle seat. As seen in the embodiment, an apparatus for manual unlocking action of a free-swinging device of a back support for an automotive seat, has a lever part 1 (FIG. 2 and FIG. 4) and a housing part 2 (FIG. 1, FIGS. 3 to 6). When assembled, the lever part 1 reaches through an opening, in particular a slot-shaped or longitudinally shaped opening 3 (FIG. 3 and FIG. 5), of the housing part 2; and it is guided inside this opening with a swinging movement. The result is that the free-swinging device, which is not shown here, is manually unlocked from its resting position in a slot end or hole end 3a (refer in particular to FIG. 3 and FIG. 5—respectively in the bottom half of the housing), and it is moved to the unlocked final position at the other slot end or hole end 3b (refer in particular to FIG. 3 and FIG. 5—respectively in the top half of the housing).

Figure 2:
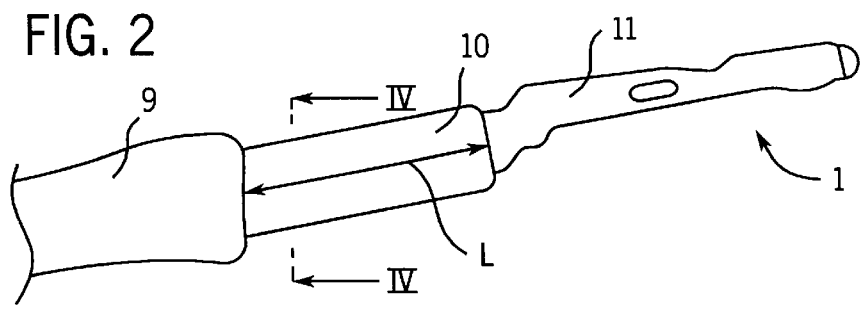
FIG. 2: in a side view position-adjusted to FIG. 1, a lever part of an apparatus according to the invention for the manual unlocking action of a free-swinging device of a back support for an automotive vehicle seat.
Figure 4:
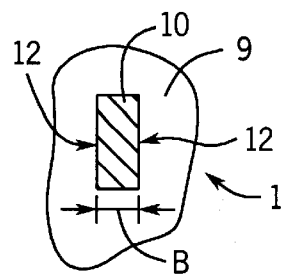
FIG. 4: the lever part in accordance with FIG. 2, represented in a sectional view along the line IV—IV in FIG. 2.
Figure 7:
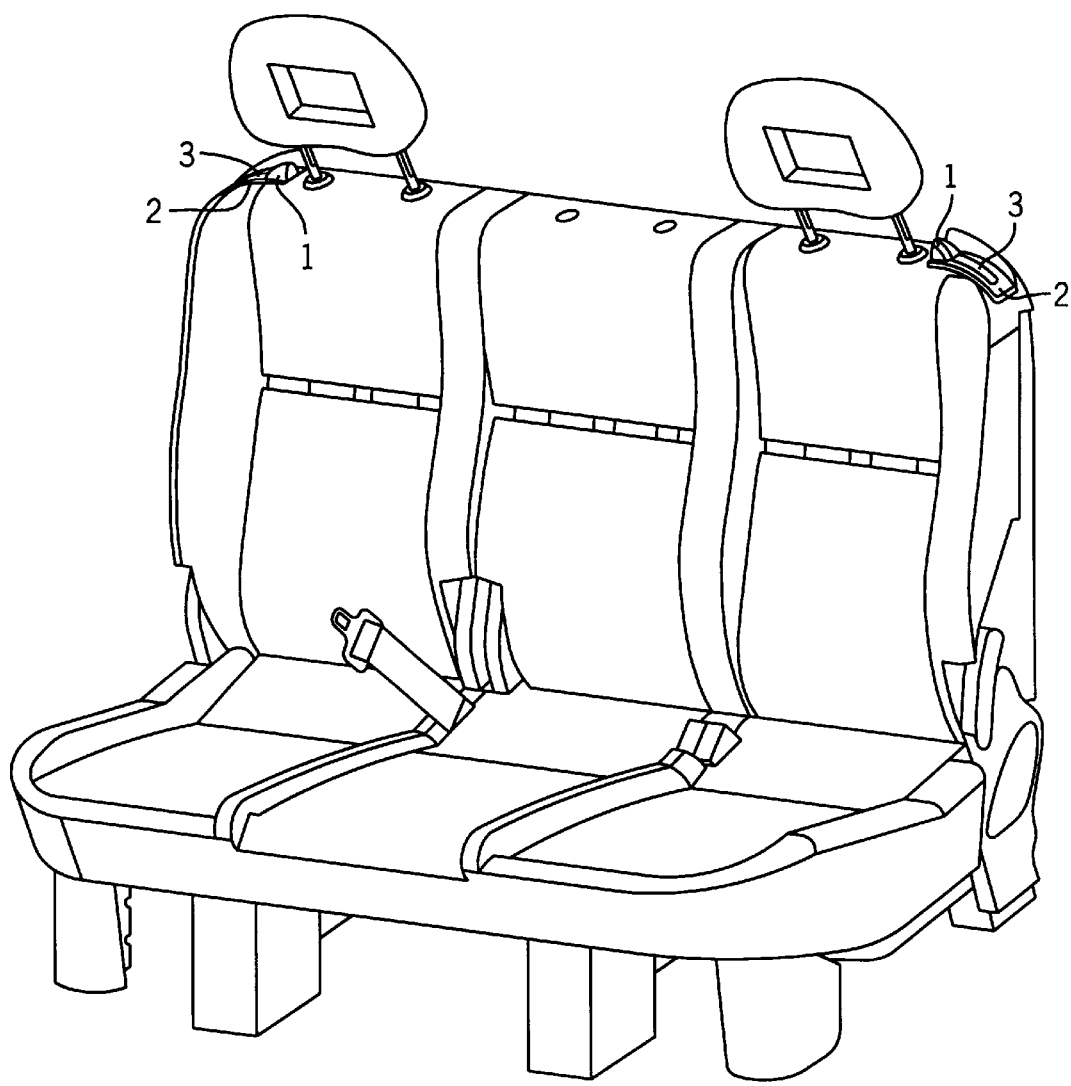
FIG. 7: a perspective view of a conventional vehicle seat having an apparatus according to the invention.

FIG. 1 and FIG. 4 clarify in particular that the housing part 2 according to the invention has at least one spring mechanism 4—in the represented example two—that are symmetrically arranged in relation to each other. The lever part 1 is latched in at least one position—in the represented instance in the resting position—between the spring mechanisms.

If necessary, it is also possible for the housing part 2 to have several, for example four, spring mechanisms 4 with which the lever part 1 can be latched inside the opening 3 in at least two of its possible positions.

As shown in FIGS. 1, 3, 5 and 6 the spring mechanism 4 is formed, respectively, by an elastic tongue on a wall 5 of the housing part 2. It is advantageous to fashion the housing part 2 as a one-piece plastic part, consisting in particular of polyoxymethylene (POM). The elastic tongue is cut free from the wall 5 of the housing part 2. This practice ensures, on the one hand, a simple way of manufacturing and, on the other hand, a stability that is adequate for the mechanical stresses that occur in particular during use.

The housing part 2 has a sleeve section 6 which forms the wall 5 for the slot-shaped or longitudinal hole-like opening 3 and which is intended to be inserted into a corresponding opening of the part of the vehicle seat that is to be locked and/or that is to be unlocked, for example the back support referred to previously. For fastening the housing part 2—as shown—into the seat part, the housing part 2 can have catch mechanisms 7 on the sleeve section 6. The catch mechanisms 7 also consist of elastic tongues that are cut free from the wall 5 of the housing part 2.

Furthermore, the housing part 2 has a collar section 8 (FIGS. 1, 3, 6) which laterally extends from the sleeve section 6 on one end. It is intended as a lateral cover for the corresponding opening of the part of the vehicle seat that is to be locked and/or to be unlocked. In addition, the collar section 8 limits the insertion movement of the housing part 2 into this opening. The collar section 8 can be formed as a plane or—as shown—arched.

The lever part 1 (FIG. 2 and FIG. 4) can be formed in different ways. In the shown embodiment it has a handle piece 9 and a shaft, which is formed of a transitional section 10 located on the handle piece 9 and of an activation section 11 subsequent to the transitional section 10. The activation section 11 can be realized, as illustrated in the drawing, in particular as flat, for example like the web of a safety key or of a car ignition key.

The transitional section 10 can be constructed as one-piece and in the same material as the handle piece 9 consisting preferably of plastic, in particular of polyoxymethylene (POM) as well. During assembly the transitional section 10 of the apparatus according to the invention is inserted in the opening 3 of the housing part 2. It can have a length L that is adjusted to the length T of the sleeve section 6 of the housing part 2. As shown in the representation in FIG. 4, the transitional section 10 can have, in particular, a rectangular cross section with the rectangle breadth B being somewhat smaller than the rectangle width W (FIG. 3 and FIG. 5) of the opening 3 of the housing part 2. The existing free motion between the wall 5 of the housing part 2 and the side wall 12 of the transitional section 10 is eliminated according to the invention in the resting position of the lever part 1 (positioned at the hole end 3a).

The present invention is not limited to the embodiment that has been illustrated here, but it includes also any and all embodiments that act identically in the spirit of the invention. For example, FIG. 5 shows that the elastic tongue forming the spring mechanism 4 inside the opening 3 of the housing part 2 has a convex arch 13 which increases its latching action on the lever part 1. In the alternative or in addition it is also possible to arrange catch elements such as stop noses, stop projections, stop openings etc., which makes the catching action of the lever part 1 in the respective spring mechanism 4 possible. Consequently, in addition to the spring-actuated locking connection described in the embodiment which exists between the lever part 1 and the housing part 2 this would provide also a positive fit of the two parts.

Moreover, the invention is not restricted to the combination of characterizing features that is defined in claim 1 but can be defined by any combination of certain characterizing features that are disclosed in total as single characterizing features. This means that in principle virtually any single characterizing feature in claim 1 can be omitted and/or replaced by at least one single characterizing features that is disclosed some place else in the application. To the extent described here the claim 1 should be understood as an initial attempt to formulate an invention.

Reference Symbols

| | |
|---|---|
| 1 | Lever part |
| 2 | Housing part |
| 3 | Opening in 2 |
| 4 | Spring medium |
| 5 | Wall of 2 |
| 6 | Sleeve section |
| 7 | Catch medium on 6 |
| 8 | Collar section |
| 9 | Handle piece of 1 |
| 10 | Transitional section of 1 |
| 11 | Activation section of 1 |
| 12 | Side wall of 10 |
| 13 | Arch of 4 |
| B | Breadth of 10 |
| L | Length of 10 |
| T | Length of 6 |
| W | Width of 3 |

What is claimed is:

1. An apparatus for manually locking and/or unlocking parts of a vehicle seat, comprising:
   a housing part having an opening, the lever part having a first position and a second position;
   a lever part reaching through the opening;
   wherein the housing part has at least one spring mechanism that latches the lever part in at least one position inside the opening, and wherein the spring mechanism is engaged with the lever part in the first position and is not engaged with the lever part in the second position.

2. Apparatus as claimed in claim 1, wherein catch elements are arranged on the lever part and on the spring mechanism thereby making it possible that the lever part and the respective spring mechanism engage each other.

3. The apparatus as claimed in claim 1, wherein the lever part has a handle piece and a shaft, which is formed by a transitional section located on the handle piece and an activation section subsequent to the transitional section, and the transitional section is inserted into the opening of the housing part and can be latched into the opening using the spring mechanism.

4. An apparatus for manually locking and/or unlocking parts of a vehicle seat, comprising:
   a housing part having an opening;
   a lever part reaching through the opening;
   wherein the housing part has several spring mechanisms that are arranged symmetrically in relation to each other with the lever part positioned between them.

5. The apparatus as claimed in claim 4, wherein the housing part has a sleeve section which forms the wall of the opening and a collar section that extends laterally on its one end, and the spring mechanisms are arranged in the sleeve section.

6. An apparatus for manually locking and/or unlocking parts of a vehicle seat, comprising:
   a housing part having an opening;
   a lever part reaching through the opening;
   wherein the housing part has several spring mechanisms that latch the lever part in at least two positions within the opening.

7. An apparatus for manually locking and/or unlocking parts of a vehicle seat, comprising:
   a housing part having an opening;
   a lever part reaching through the opening;
   wherein the housing part has at least one spring mechanism that latches the lever part in at least one position inside the opening, and wherein the spring mechanism comprises an elastic tongue on a wall of the housing part.

8. The apparatus as claimed in claim 7, wherein the elastic tongue is cut from the wall of the housing part.

* * * * *